United States Patent [19]

Hoormann

[11] Patent Number: 4,932,317
[45] Date of Patent: Jun. 12, 1990

[54] PROCESS AND DEVICE FOR PREPARATION OF A MULTILAYER CONFECTIONERY PRODUCT AND CONFECTIONERY PRODUCT

[76] Inventor: Walter Hoormann, Hollerallee 32, D-2800 Bremen, Fed. Rep. of Germany

[21] Appl. No.: 369,512

[22] Filed: Jun. 21, 1989

Related U.S. Application Data

[63] Continuation-in-part of Ser. No. 287,224, Dec. 21, 1988, abandoned.

[30] Foreign Application Priority Data

Dec. 22, 1987 [DE] Fed. Rep. of Germany ....... 3743650

[51] Int. Cl.[5] .................. A22C 7/00; A23G 1/20; A23P 1/00
[52] U.S. Cl. .................. 99/450.2; 99/450.1; 425/131.1
[58] Field of Search .................. 99/494, 450.1, 450.2, 99/450.7, 450.8, 450.4, 352, 353, 483, 484, 516, 534; 118/13, 16, 24; 425/133.1, 131.1, 376 R; 239/548, 549, 556, 566; 426/101, 279, 249, 516; 62/322

[56] References Cited

U.S. PATENT DOCUMENTS

| | | | |
|---|---|---|---|
| 2,289,326 | 7/1942 | Howser | 426/101 |
| 2,568,491 | 9/1951 | Edwards | 99/494 |
| 2,572,833 | 10/1951 | Balzarini | 99/494 |
| 2,704,442 | 3/1955 | Nelson | 62/322 |
| 3,342,143 | 9/1967 | Bell | 426/249 |
| 3,770,460 | 11/1973 | Vroman | 426/279 |
| 4,449,906 | 5/1984 | Sienkiewicz et al. | 99/450.2 |
| 4,542,028 | 9/1985 | Butcher et al. | 426/101 |
| 4,614,489 | 9/1986 | Juravic | 425/376 R |
| 4,698,000 | 10/1987 | Thulin et al. | 99/450.7 |
| 4,699,047 | 10/1987 | Lee et al. | 425/131.1 |

FOREIGN PATENT DOCUMENTS

0173982 3/1986 European Pat. Off. .......... 99/450.1

*Primary Examiner*—Timothy F. Simone
*Attorney, Agent, or Firm*—Wegner & Bretschneider

[57] ABSTRACT

The invention relates to a process and a device for preparing a multilayer, especially strand-like, especially thin-layer confectionery product, especially of aerated ice cream with interlayered covering, especially cocoa-glaze layers, on a base bed, which contains at least two layers or beds disposed one above the other, of which at least one layer is injection-molded under pressure from an injection-molding die onto a base bed or onto a lower confectionery layer, especially when confectionery-material-free air chambers are formed at least in sections between two neighboring layers and/or especially when the vertical extent of at least one wavy layer is larger than its thickness, the base bed having, for at least part of the time, a relative velocity with respect to the confectionery material discharge or delivery rate of the injection-molding die, a wavy layer being so formed that its crest lines run substantially in the longitudinal direction of the confectionery product to be prepared.

28 Claims, 3 Drawing Sheets

PROCESS AND DEVICE FOR PREPARATION OF A MULTILAYER CONFECTIONERY PRODUCT AND CONFECTIONERY PRODUCT

This is a continuation-in-part application of United States application Ser. No. 287,224, filed Dec. 21, 1988, ABND.

BACKGROUND OF THE INVENTION

The invention relates to a process for preparing a multilayer, especially strand-like, and especially thin-layer confectionery product, especially of aerated ice cream and the likely (hereinafter referred to as ice cream) with interlayered covering, especially cocoa-glaze layers, on a base bed, which generally contains at least two and preferably a greater plurality of layers or beds disposed one above the other, of which at least one layer is injection-molded under pressure from a nozzle-like injection-molding die onto a base bed or onto a lower confectionery or covering layer, especially when confectionery-material-free air chambers are formed at least in sections between two neighboring layers and/or especially when the vertical dimension of at least one and preferably a plurality of wavy layer(s) is larger than its (layer) thickness; the supporting base bed for the confectionery product to be prepared and/or a layer lying thereunder in the confectionery product has, for at least part of the time during the preparation, a relatively increased velocity relative to the confectionery material discharge or delivery rate of the injection-molding die.

The invention also relates to a device for preparing a multilayer, especially strand-like, and especially thin-layer confectionery product, especially of aerated ice cream with interlayered covering, especially cocoa-glaze layers, on a base bed, which contains at least two layers disposed one above the other, with at lest one injection-molding or spraying die, which is in communication through at least one nozzle feed line with at least one confectionery-material reservoir to be subjected to excess pressure by means of a pressure generator, and the injection-molding die of which is so designed or disposed that its outlet direction encloses an angle of less than 90° with the base bed and with a base bed supporting the confectionery product to be formed, especially for carrying out the aforesaid process.

The invention also relates to a multilayer, especially thin-layer and/or strand-like confectionery product, especially an aerated ice cream with interlayered covering, especially cocoa-glaze layers, with at least two confectionery layers disposed one above the other, especially with confectionery-material-free air chambers disposed at least in sections between layers disposed one above the other, and/or especially with at least one wavy layer, the vertical dimension of which is larger than its (layer) thickness.

Just as confectionery products consisting of, for example and especially, ice cream, as well as of, for example and especially, cocoa-glaze layers, and having the most diverse configurations are known, so have processes and devices for the preparation thereof been known for many years.

For the preparation of confectionery products of the type under consideration here, the most diverse processes and devices—depending on the confectionery product in question—are known that respectively are devoted entirely to the confectionery product in question. As regards the creation known as a "confectionery product", when one thinks of, for example and especially, a multilayer ice cream product, one is reminded in this regard of, for example, the creation of neapolitan and spumoni ice cream, the ice cream products cited above having been known for many years in the art pertaining thereto.

Japanese Patent Application 20065/1966 describes a two-layer ice confection which contains, among other substances, a confectionery filling as well as a chocolate or cocoa coating.

Ice-cream sandwiches with biscuit constituents are described, in, for example, British Pat. No. 1,219,593.

In the process known from U.S. Pat. No. 2,517,756, an ice-cream material that is still or already capable of flowing is filled into containers that already contain relatively hard biscuits.

U.S. Pat. No. 3,770,460 discloses a process in which flowable, edible materials are filled successively into a mold and frozen for the preparation of ice popsicles.

For the preparation of a "multilayer" alimentary-ice confectionery product of the Stratiatella type, U.S. Pat. No. 2,289,326 discloses how to provide perforations or holes in a block consisting of ice-cream material, which holes are filled with a covering material such as syrup or the like.

A multilayer product consisting of different confectionery materials has also been disclosed by Japanese Patent Application 55/104,857.

Confectionery products of, for example, three layers, that are extruded are known from, for example, British Pat. No. 1,439,143.

British Pat. No. 2,072,482 discloses a multilayer food product with intermediate layers of a covering material such as, for example, cocoa glaze, and British Pat. No. 1,354,469 discloses a process for preparing a confectionery product in which a relatively sticky material is extruded onto a melted layer of a coating material.

Whenever the terms "extrusion", "extrusion device", "extrusion nozzle" or the like are used hereinbefore or hereinafter, it should be noted that the term of "extrusion" carries the meaning as known in the pertinent art.

The material to be processed is not heated (this would certainly be a catastrophe; for example, an ice cream mix is processed at approximately −6° to −8°C.), but instead—as is clear from British Pat. No. 1,059,979, for example—the extrusion device is merely a kind of injection-molding device with a reservoir for confectionery material such as ice cream mix (plus, if necessary, a second storage reservoir for cocoa glaze or the like), the contents of which are to be forced by means of an excess pressure (to be applied, for example, by a pump or by a pressurized hydraulic or pneumatic fluid) out of at least one outlet hole of the storage reservoir, with which a "nozzle"—if necessary by means of a connecting line —is in communication. If necessary, a kind of distributor can be disposed after such an outlet point of such a storage reservoir, if the intention is to form two or more layers from one and the same storage reservoir; or a plurality of storage reservoirs can also be disposed in series for the same purpose, it then again being possible to dispose, on each storage reservoir, at least one outlet or charging tube or the like, the free outlet end of which is described predominantly as the "extrusion nozzle" in the publications discussed above.

The application of such in injection-molding process to the narrower art of preparation of confectionery products, especially ice cream, has already been known for many years —as has also been explained above. For example, a special-purpose machine manufacturer (namely GHN Sondermaschinenbau GmbH, Hamburg, and its legal predecessor, the Kurt Hintze Company) has already been offering such injection-molding machines to the ice cream industry for many years. A publication on the application of such an injection-molding process to the preparation of ice cream is to be found, for example, in U.S. Pat. No. 4,020.643. The ice cream industry then adopted this basic process much later and somewhat further developed it in its details. In this regard, reference can be made, for example, to West German Offenlegungsschrift 3,231,560, which discloses a process and a device with pivotable injection-molding dies (extrusion nozzles) for the formation of wavy layers. A process with the same result is described in, for example, West German Patent 3,436,578, in which process such wavy layers are produced by a differential velocity between a belt conveyor functioning as the supporting base bed and the "extrusion nozzles", by the fact that the outlet velocity of the injection-molding device is greater than the velocity of the belt conveyor.

The formation of such wavy layers as defined above (i.e., confectionery layers that have substantially "wavy" or "zigzag" or similar shape) has proved to be expedient for various reasons, and specifically with regard in the first place to the preparation of confectionery products according to the characteristic features of this invention and in the second place to the confectionery product itself in terms of its appearance and probably also—albeit to a relatively small extent—in terms of the "eating experience". Last but not least, such a confectionery product with enclosed air chambers is unquestionably advantageous from the viewpoint of sales psychology as well, since it necessarily leads to a relatively large volume product for a given weight of confectionery mix, which product, relative to other comparable confectionery products, meets with corresponding approval among the potential buyers for this reason also, among others.

SUMMARY OF THE INVENTION

A feature common to all confectionery products of this general type that are provided with wavy layers and if desired, enclosed air chambers, is the feature that these chambers run transversely with respect to the longitudinal extent of the confectionery product, which most generally is of strand shape, since those skilled in the art have heretofore assumed that this is indispensible in particular for quasi-continuous preparation. It is from this starting point that the efforts described above were then also undertaken to find technically and economically satisfactory solutions for the preparation of such wavy layers or air chambers. Aside from the fact that all of the known preparation processes and all of the devices designed and suitable for this purpose still have various disadvantages, even the confectionery material to be prepared therewith suffers from disadvantages. For example, a confectionery product with laterally open air chambers presents an unsatisfactory appearance, and so considerable efforts have already been undertaken to conceal these continuous, laterally open air chambers by decorations or the like.

Furthermore, the processes and devices known heretofore for the preparation of these confectionery products also involve numerous disadvantages in the very preparation process. These disadvantages already begin with the not inconsiderable expense, since heretofore it has only been possible to form the layers individually in succession, so that the devices employed are very voluminous and correspondingly expensive. Moreover, it is not possible, for example, to prepare wavy layers of practically any desired shape, and the introduction of thin intermediate layers of, for example and especially, cocoa-glaze or the like; has also not yet been technically solved satisfactorily.

Accordingly, the object of the present invention is to improve the known processes and devices and, last but not least, the known confectionery products, while avoiding the aforesaid and other disadvantages. In this connection, a first object is to provide the possibility of being able to prepare according to the invention confectionery products that have any desired cross-sectional structure, and specifically, particularly for a confectionery product, consisting at least predominantly of ice cream material, in such a manner that a structure is obtained that is also satisfactory in terms of firmness, so that the finished confectionery product does not substantially collapse after the preparation as has predominantly been the case heretofore. Another object is to provide the possibility of being able simultaneously to prepare at least two layers, but preferably all layers of such a confectionery product, preferably with one and the same injection-molding device or with a single injection-molding head. Furthermore, the confectionery product to be created according to the invention is intended to be so formed at its outside surfaces that there is no further need for an additional decoration or the like, in order to conceal the enclosed air chambers and to give the confectionery product an acceptable appearance. Another object is to considerably reduce the capital and production expense by the present invention, and to provide a device that is simpler to handle in terms of maintenance.

The process-related part of the above object is achieved according to the invention by providing that a wavy layer is so formed that its crest lines run substantially in the longitudinal direction of the strand-like confectionery product to be prepared.

As regards the device-related part of the above object, it is primarily provided according to the invention that the outlet of the injection-molding die is so designed that the crest lines of a wavy layer run substantially in the longitudinal direction of the strand-like confectionery product to be prepared.

As regards the confectionery product itself, it is primarily provided according to the invention that the wavy layer or layers are so disposed that their crest lines run substantially in the longitudinal direction of the confectionery product, which is generally of strand-like structure.

Preferred embodiments of the present invention will be briefly discussed in the following, while the other embodiments ought to be immediately obvious to one skilled in the art from the above remarks as well as from the following description of exemplary embodiments with reference to the drawing.

The above main object as well as the secondary objects indicated above in connection therewith can obviously be achieved in accordance with the invention and therefore in definitely optimum manner because, in wavy layers having crest lines that run in the longitudinal direction of the strand-like confectionery product, the difficulties that the industry pertaining thereto has had heretofore in the preparation of transversely running wavy layers do not occur at all from the very beginning on. At the same time the possibility is directly created of forming the confectionery product formed according to the invention in closed manner without additional decoration on its outer sides; the possibility nevertheless being created of forming, whenever desired, the most diverse decorations, although with practically no extra expense, on the side surfaces, for example.

An additional feature is that the channel-like air chambers running in the longitudinal direction of the strand-like confectionery product obviously offer several advantages, which transversely running air chambers cannot exhibit.

Furthermore, the "honeycomb structure" of the confectionery product according to the invention can be made as desired according to the particular wish. Thus, wavy layers, for example, can be formed with approximately sinusoidal shape; although if desired they can also be formed with, for example, zigzag shape or with a practically arbitrary diversity of other shapes. It is possible both for wavy layers to be adjacent to each other and also, for example, for a wavy layer to be adjacent to a substantially plane layer. Nevertheless, practically any desired thin covering layers can be introduced as intermediate layers without any technical difficulties whatsoever.

A very considerable advantage of the present invention compared with the prior art lies in the fact that two or more layers of any desired configuration and, in a limited case, even all layers can be formed simultaneously. In this connection, not only is it possible simultaneously to produce practically the entire cross-sectional profile of the confectionery product according to the invention, but it is also possible to do so with a single injection-molding die, whereby the capital costs for the necessary devices can be reduced in positively dramatic manner.

As regards the shaping of the wavy and other layers, this can be so performed according to the invention so that optimum conditions in terms of firmness are created, which obviously is not possible in the prior art. For example—as will be further explained later on the basis of exemplary embodiments—lattice structures can be created in which the support conditions are optimum, so that the confectionery product according to the invention, even as an ice cream product, no longer more or less collapses inward after its preparation, as is the case in the prior art, but retains its predesignated structure, as is highly desirable.

In this connection, not only the injection-molded ("extruded") layers can be formed in the advantageous manner outlined above, but also interlayered intermediate covering layers of, for example and especially, cocoa glaze or the like, can be introduced by spraying, and specifically this can also be performed simultaneously with the formation of confectionery layers of ice cream material, for example. The danger that in principle exists of freezing of, for example, cocoa-glaze mix, can be eliminated in simple manner according to the invention by providing that such a spraying die or a spraying part of an injection-molding machine is heated, preferably up to the outlet or spraying pint, and/or that parts of the device conveying ice cream mix are thermally insulated from their surroundings (and thus also form the parts conveying, for example, the cocoa-glaze mix), so that the heat exchange between the sections conveying ice cream and the sections conveying, for example, cocoa-glaze mix, can be reduced to such an extent that it can be disregarded or that it is at least harmless.

BRIEF DESCRIPTION OF THE DRAWING

The invention is explained further in the following by means of exemplary embodiments and with reference to a drawing, wherein.

DESCRIPTION OF THE PREFERRED EMBODIMENTS

Figure 1:
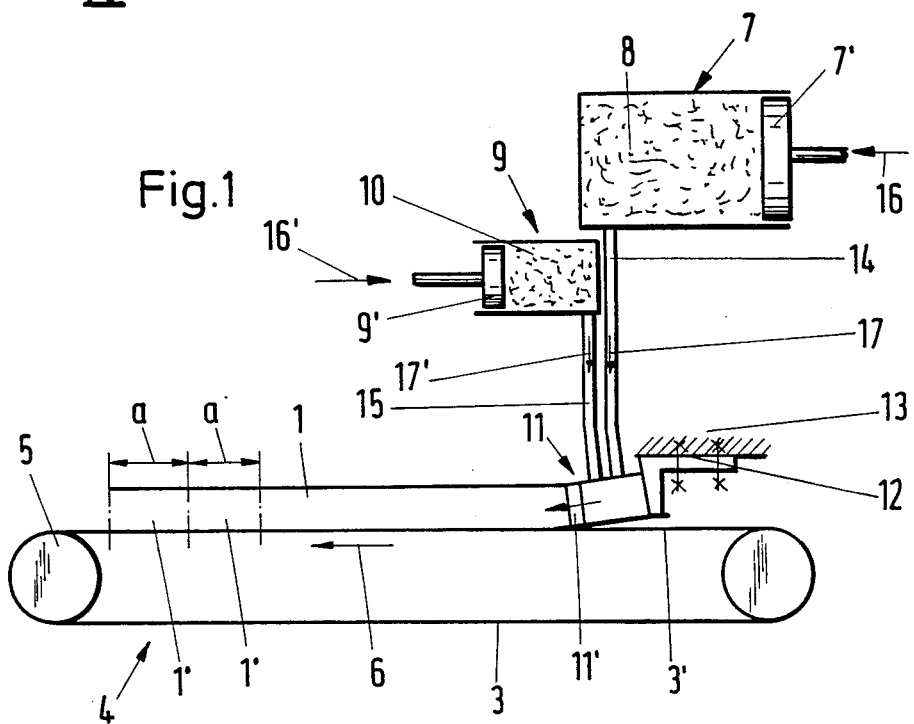
FIG. 1 shows a highly schematic diagram of a device according to the invention for preparing a confectionery product according to the invention, which product consists in the first place of ice cream and in the second place of cocoa-glaze mix.

FIG. 1 shows a highly schematic basic diagram of a device according to the invention for preparing a multilayer, strand-like, thin-layer confectionery product 1, namely of ice cream with interlayered cocoa-glaze layers 2 (see, for example, FIGS. 2 and 5), as is further explained later. In the illustrated exemplary embodiment, the preparation process takes place on the conveyor belt 3 of a belt conveyor 4, that forms the supporting base bed for the confectionery product 1 and that can be driven in the direction of the arrow 6 (in a manner that can be controlled in terms of its transport velocity) by means of a drum drive disposed in its head drum 5. In the process, the confectionery product 1 can be produced either directly on the upper half 3' of the conveyor belt 3, or else on, for example, tray-like base beds of dimensionally stable plastic sheeting or the like, which can right there and then form a packing element in the subsequent packing step, which packing element is also to be used as a base for the consumer during subsequent consumption.

The confectionery product 1 possesses a plurality of layers disposed one above the other, as will be further explained in detail later, and specifically, on the one hand, layers of ice cream material which are produced by injection molding, and, on the other hand, interlayered cocoa-glaze layers which are created by spraying of cocoa-glaze mix.

In the exemplary embodiments explained later by means of FIGS. 2 and 5, the layers consisting of ice cream are alternately of wavy or zigzag or plane form, i.e., such wavy layers alternate with plane layers, although obviously it is also possible, for example, for layers of wavy, zigzag or similar form to be adjacent to one another, as will further be made obvious on the basis of, for example, FIG. 6.

The device illustrated in FIG. 1 essentially comprises an ice cream reservoir 7 that contains ice cream mix 8, a cocoa-glaze reservoir 9 that contains cocoa-glaze mix 10, a single injection-molding and spraying die 11, which is connected securely to the surroundings 13 in a suitable manner (in FIG. 1 a stirrup-shaped fastening frame 12 is indicated for this purpose), the surroundings being able to be, for example, a frame construction, a building part or the like.

An ice cream feed line 14 is provided between the ice cream reservoir 7 and the injection-molding and spraying die 11, while a cocoa-glaze feed line 15 is disposed between the cocoa-glaze reservoir 9 and the injection-molding and spraying die 11. Obviously a plurality of connecting lines can also be present respectively between the reservoir 7 or 9 and the injection-molding and spraying die 11, or a plurality of reservoirs containing, if necessary, a different ice cream mix or different covering materials can be provided, which nevertheless changes nothing of the principle although it allows further advantages of the present invention to be discerned.

The two reservoirs 7, 9 are subjected to excess pressure relative to the atmosphere. This is indicated respectively by a piston 7' or 9', each of which is loaded by force in the direction of an arrow 16 or 16'. Obviously, however, the pressure to which the ice cream mix 8 or the cocoa-glaze mix 10 is subjected can also be generated in any other manner, namely, for example, by means of a suitable hydraulic or pneumatic fluid such as, for example, purified compressed air, which under some circumstances can have considerable advantages in terms of the process.

To produce the strand-like confectionery product 1, which will be discussed in detail in the following the ice cream mix 8 and the cocoa-glaze mix 10 are subjected to a suitable, preferably adjustable pressure, so that material is fed to the injection-molding and spraying die 11 in the direction of the arrows 17 and 17', which material then emerges from the head 11' of the injection-molding and spraying die 11 as the finished confectionery-product strand.

The ice cream feed line 14 is thermally insulated up to the outlet located at the head 11', and the cocoa-glaze feed line 15 is suitably heated up to the spray nozzles of the head 11, so that the ice cream mix 8 does not lose its ideal processing temperature of approximately −3° to −10°C., preferably −6° to −9°C. (at this temperature, the usual ice cream mix is known on the one hand to be still dimensionally stable, but on the other hand to be "pasty", and so not only can it be injection-molded in excellent manner but also it can be cut thereafter into portions). Therefore, freezing phenomena at the outlets of the spraying and injection-molding die 11, as were feared at first by technical laymen, are obviously not to be feared, since the ice cream mix certainly can be subjected to a pressure as high as desired, so that obviously no addition phenomena whatsoever occur even in the case of extremely thin ice cream layers.

At the same time, however, the cocoa-glaze mix 10 also retains its processing temperature, which is ideal for the spraying process intended here, and it hardens only after the spraying process, as is also intended, but it is obviously completely unproblematic for the processing operation.

The air chambers 18 being formed during the preparation of the confectionery product 1 and running in the longitudinal direction of the strand are not subject to the danger that a vacuum or a negative pressure will develop therein thus favoring or even forcibly causing collapse of the intended lattice structure, since the chambers 18 are in communication with the atmosphere, so that pressure equalization can take place. In the production of particularly long strands, precautions can be taken in the simplest way to ensure that communication of the chambers 18 with the atmosphere is established by, for example, the design of the injection-molding and spraying die 11 or its head 11' (if necessary, in addition to the end of the confectionery-product strand), which is sufficient even for long strands, since in the confectionery product according to the invention—in contrast to the prior art—collapse of the lattice structure after the preparation just does not occur, if so desired.

The device according to the invention (see FIG. 1) is obviously very much simpler than comparable devices (see, for example, West German Offenlegungsschrift 3,231,560 or West German Pat. 3,426,578), since the entire strand of the confectionery product 1 can be formed by means of a single injection-molding and spraying die whereas in the prior art a separate means or device is necessary for each layer. The latter obviously is possible even in reduction of the present invention to practice, although, simply for economic (not to mention technical) reasons, use thereof will be made only in certain exceptional circumstances, namely if particulary difficult materials are involved in processing and there is a need to take special process-related precautions (by heating and/or cooling, for example) that can be achieved better with two or more individual devices.

Figure 2:
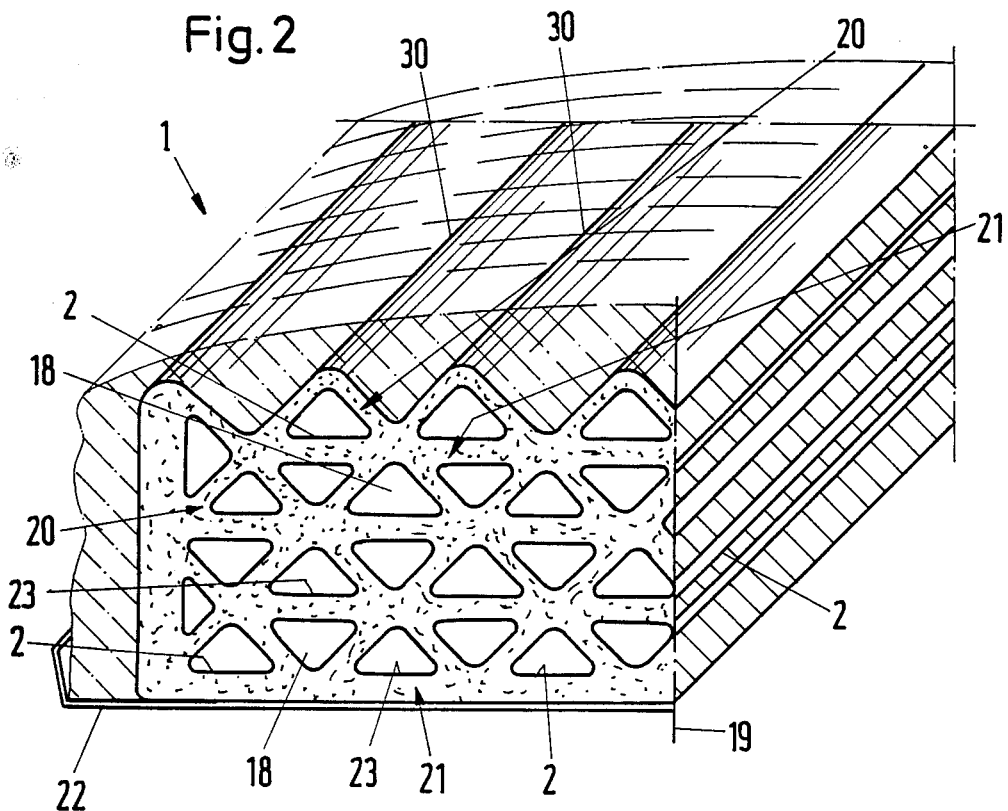
FIG. 2 shows an exemplary embodiment of a confectionery product (ice cream with interlayered intermediate cocoa-glaze layers) in a cross section and longitudinal section.

FIG. 2 shows an example of a confectionery product 1 according to the invention in a sectional diagram, and specifically the left half of a longitudinal section of a confectionery-product strand. In FIG. 2, the central vertical line of symmetry is denoted by 19. Some of the ice layers are formed as wavy ice layers 20 and others as plane ice layers 21, a wavy ice layer 20 alternating respectively with a plane ice layer 21.

The production of the confectionery product 1 according to FIG. 2 takes place on a device such as has been described above in principle on the basis of FIG. 1. In this case, however, the strand-like confectionery product 1 is deposited not directly on the upper half 3' of the conveyor belt 3, but on a strand of dimensionally stable plastic sheeting or trays 22 that functions as the support and that can be severed at the same time as the strand-like confectionery product 1 is cut. Alternately, however, it is also possible to produce the confectionery product 1 directly on the upper half 3' of the belt conveyor 4, to perform the cutting process there in order to create portions 1' having a length "a" (see FIG. 1) and to deposit the individual portions 1' only thereafter on dish-like plastic trays 22, which then simultaneously form a constituent of the total package.

FIG. 2 shows that the bottom layer of the confectionery product is a plane ice layer 21, and that adjacent thereto there is placed a first wavy ice layer 20 and so on, the individual layers nevertheless being formed integrally as is shown in FIG. 2, so that a lattice structure having excellent load-bearing properties is obtained. This contributes to the fact among others that the confectionery product 1 according to FIG. 2 does not collapse inward to some extent after its preparation, as is the case for comparable confectionery products which are now already on the market. Instead, the established air chambers 18 are maintained at least substantially, and so therefore a confectionery product 1 of this invention is obtained with ideal properties.

In addition to the ice layers 20, 21, cocoa-glaze layers 23 as intermediate layers are also present, and specifically at each bottom and side section of an air chamber 18. Obviously it is also possible, if so desired, for only selected chambers 18 to be sprayed with cocoa glaze.

A wavy layer 20 is formed so that its crest lines 30 run substantially in the longitudinal direction 6 of the confectionery product 1.

Where it is not intended to relinquish the properties and configurations already described in detail in the preceding, but the confectionery product illustrated with bold external contours in FIG. 2 is not desired in terms of shape for any reasons whatsoever, a completely different external contour obviously can be created by a slight modification of the injection-molding die. An example thereof is indicated in FIG. 2 by means of lines of dashes and dots.

Figure 3:
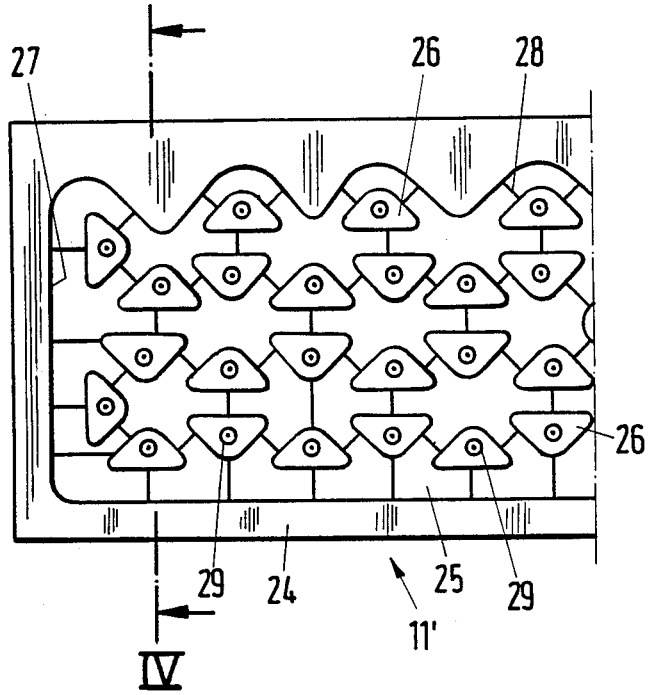
FIG. 3 shows a (lateral) horizontal projection of the outlet of an injection-molding and spraying die according to the invention for the preparation of a confectionery product according to FIG. 2.
Figure 4:
FIG. 4 shows a schematic section through the die according to FIG. 3, viewed in the direction of the section line IV—IV in FIG. 3.

The essential part of the injection-molding and spraying die 11, namely the outlet side of its head 11', is illustrated in FIGS. 3 and 4. In the illustrated exemplary embodiment the head 11' is of substantially block-like structure, although obviously a plate-like structure or other structure is possible. "Channels" ending in slots are machined into the block 24, corresponding to the desired structure of the confectionery product Stated more precisely, the head 11' of the injection-molding and spraying die 11 is in the first place provided with only one "channel" 25, in which there are disposed profiled bars 26 in the manner shown in FIG. 3 (and FIG. 4), spaced with respect to each other and also with respect to the inside wall 27 of the hollow block 24. In order to be able to hold the profiled bars 26 in the manner shown in FIGS. 3 and 4, the bars are provided with distance pins 28 or the like, which hold the profiled bars 26 in position. These pin-type spacing means 28 are more advantageous than continuous web-type spacing means, because they prevent a "continuous cut" in the ice layers 20 or 21. In other words, it has been shown that the ice cream mix, after passing the distance pin 28, "coalesces" again, especially if the distance pins 28 are not disposed immediately before the outlet end of the head 11 shown in FIG. 3, which can be achieved without difficulties.

As can also be clearly seen from FIGS. 3 and 4, the profiled bars 26 do not merely function as shaping means for the confectionery product 1, but they also contain—preferably right at the center—the feed lines for the cocoa-glaze mix 10. These feed lines end in nozzles 29, which are shown in FIG. 3. The feed lines provided for cocoa-glaze mix 10 and running centrally through the profiled bars 25 are thermally insulated, so that the "cold" entrained by the ice cream mix cannot lead to the situation that the cocoa-glaze mix hardens somewhat in the feed lines and is no longer sprayable when it emerges from the head 11'. It would therefore be equally valid to speak of thermally insulating the channels conveying the ice cream mix, which channels are formed by the inside wall 27 of the block 24 as well as the outsides of the profiled bars 26. In terms of configuration, it is also possible and intended to heat the feed lines for cocoa-glaze mix 10. This can be achieved by, for example, heat exchange, for which purpose hot water, for example, can be passed along the outsides of the feed lines for cocoa-glaze mix, preferably in countercurrent manner. The countercurrent heating is expedient in this case because the heating agent, i.e., water, arrives at the head with highest temperature in the region of the outlet or of the nozzles 29, and there ensures that no freezing whatsoever can occur under any circumstances. The injection-molding or spraying die 11 can be heated so that the cocoa-glaze material or the like has an outlet temperature above the hardening temperature.

FIG. 4 shows a section through the head 11' according to FIG. 3, for the preparation of a confectionery product 1 according to FIG. 2.

Figure 5:
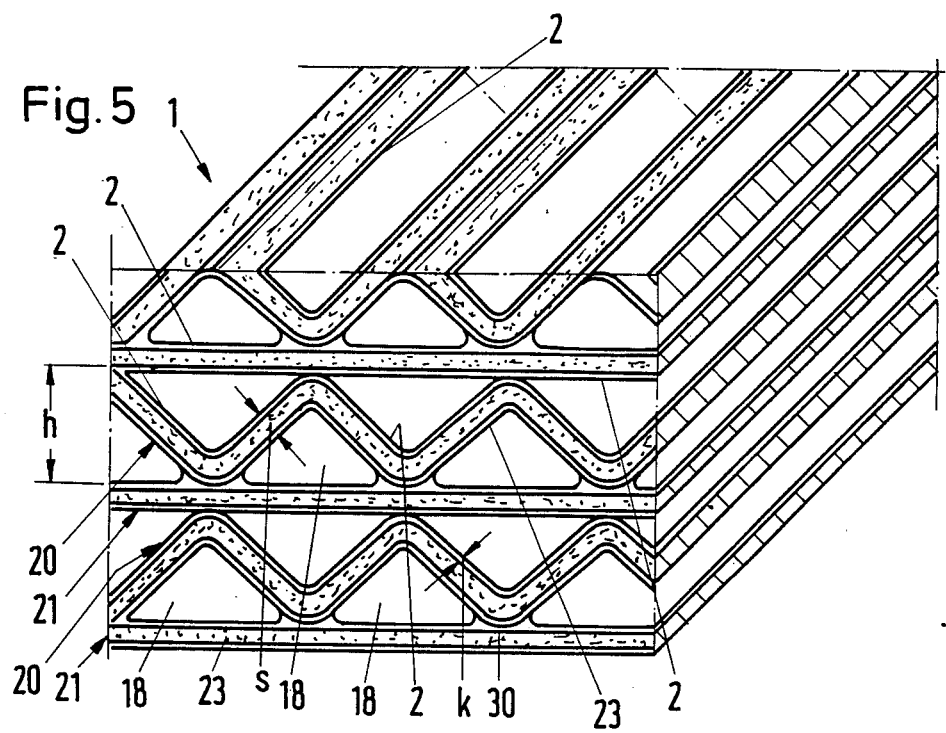
FIG. 5 shows an alternative embodiment of a confectionery product in a representation according to FIG. 2.

FIG. 5 shows an alternative embodiment in a representation according to FIG. 2. It is obvious that, in this alternative embodiment, the individual ice layers 20 and 21 are not formed in truly integral manner. This obviously can also be achieved with a single injection-molding and spraying die 11; but in the exemplary embodiment according to FIG. 5 it was effected in another way, namely by the fact that a plurality of injection-molding and spraying dies 11 was disposed in series in the conveying direction 6 of the belt conveyor 4, so that the bottom plane ice layer 21 is formed first. Thereafter a continuous cocoa-glaze layer 23 is sprayed from nozzles 29 onto the layer 21, and then the first wavy ice layer 20 having height "h" is applied and so on. If a confectionery product according to FIG. 5 is produced with a single injection-molding and spraying die 11, the chambers 18 can be sprayed substantially completely with cocoa-glaze mix, as is additionally indicated in FIG. 5, so that the chambers are provided all around with cocoa-glaze material.

As shown in FIG. 5, "s" represents the thickness of an ice cream layer 20, 21, which can be approximately at least 3 mm, and at most 5 mm. The cocoa-glaze covering material 10 can be sprayed with an initial spray-jet diameter of about 0.5 to 1.0 mm, preferably 0.8 mm. The thickness "k" of a cocoa glaze layer 23 is preferably equal to almost 1 mm.

Figure 6:
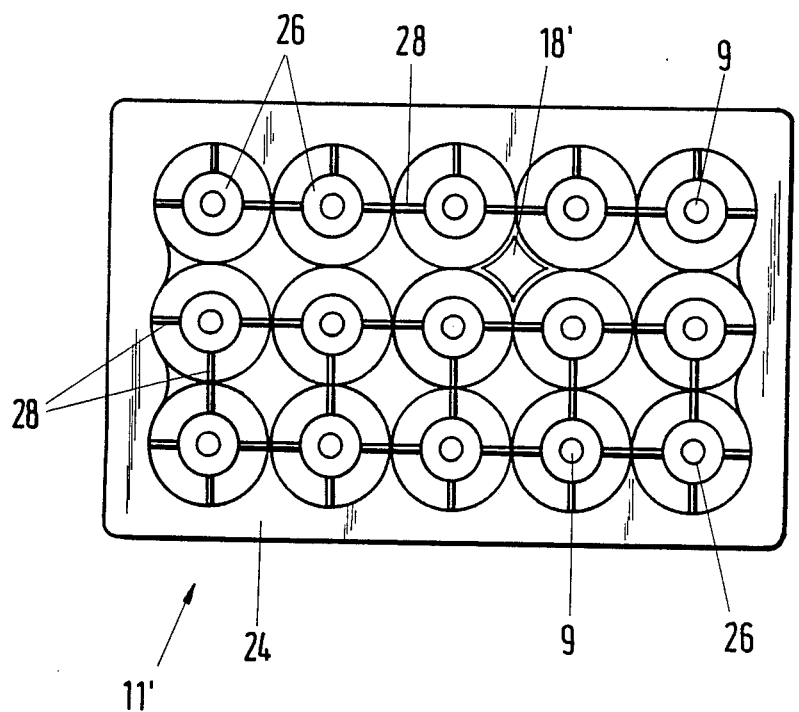
FIG. 6 shows an alternative embodiment of a device according to the invention or its injection-molding and spraying die in a representation according to FIG. 3.

FIG. 6 shows an alternative embodiment of a head 11' of an injection-molding and spraying die 11 in a representation according to FIG. 3, specifically viewed from the outlet side. Once again a block 24 is provided in this alternative embodiment. In this exemplary embodiment the profiled bars 26 have the form of round bars, distance pins 28 again being used here as spacing means. Not only can the injection-molding and spraying die 11 according to FIG. 6 be manufactured particularly simply and therefore particulary inexpensively, but also it leads to a confectionery product 1 (not illustrated in the drawing, since one skilled in the art can easily imagine it from the other exemplary embodiments), that is particularly dimensionally stable in terms of its chambers 18 (the chambers 18 obviously have substantially a cross-sectional shape of the type denoted by 18' in the upper middle part of FIG. 6).

On the basis of the foregoing explanations, it ought to be immediately apparent that both the process according to the invention and the device according to the invention, last but not least, the confectionery product according to the invention exhibit extremely outstanding advantages compared with the prior art, which advantages heretofore were not considered to be possible by those skilled in the art, as can be deduced at least indirectly and prima facie from the extensive literature pertaining to this art.

In the confectionery product of this invention, confectionery layers can be used which include all other possible fat-glaze layers among others and, moreover, still other materials that are usual or in any way suitable for the formation of intermediate layers in multilayer ice cream products, namely, for example, fruit pulp, fruit sauces and the like. This invention is not limited to ice cream, but may include sherbet, sorbet and the like as the confectionery product.

I claim:

1. A device for preparing a multilayer confectionery product comprising: a base bed for supporting the confectionery product which includes at least two layers disposed one above the other, an injection-molding device having a nozzle-like injection-molding and spraying die for forming the layers, in communication through a feed line with a confectionery-material reservoir for communicating with excess pressure by means of a pressure generator, and the injection-molding and spraying die having an outlet disposed in a direction enclosing an angle of less than 90° with the base bed, wherein the outlet of the injection-molding and spraying die forms crest lines of a wavy layer running substantially in the longitudinal direction of the confectionery product.

2. A device according to claim 1, wherein the outlet of the injection-molding and spraying die for forming a wavy layer consists of an outlet slot of substantially wavy or zigzag shape corresponding substantially to the cross-sectional profile running transversely with respect to the longitudinal direction of the confectionery product.

3. A device according to claim 2, wherein the width of the outlet slot is substantially identical to the width of the confectionery product layer to be formed.

4. A device according to claim 2, wherein the injection-molding and spraying die comprises in a region of a half-wave section of the outlet slot an outlet opening that is in communication with the atmosphere.

5. A device for preparing a multilayer confectionary product of ice cream with interlayered covering, comprising: a base bed for supporting the confectionery product, which includes at least two layers disposed one above the other, and an injection-molding device having a nozzle-like injection-molding and spraying die in communication through a feed line with a confectionery-material reservoir for communicating with excess pressure by means of a pressure generator, and the injection-molding and spraying die having an outlet disposed at a direction enclosing an angle of less than 90° with the base bed, wherein the injection molding and spraying die includes a plurality of outlet slots.

6. A device according to claim 5, wherein the outlet slots are disposed one above the other with vertical spaces therebetween.

7. A device according to claim 5, wherein at least one of the outlet slots is of substantially wavy or zigzag shape.

8. A device according to claim 5, further comprising a spray nozzle for spraying covering material disposed between two adjacent outlet slots of the injection-molding and spraying die.

9. A device according to claim 5, wherein a single injection-molding and spraying die is used which contains all of the outlet slots.

10. A device according to claim 1, wherein the injection-molding and spraying dies and the feed lines are heatable.

11. A device according to claim 10, wherein the injection-molding and spraying dies and the feed lines are heated substantially up to the outlet.

12. A device according to claim 11, wherein the injection-molding and spraying dies are heated so that the confectionery product is liquid or pasty during or after emergence from the injection-molding/spraying dies.

13. A device according to claim 12, wherein the injection-molding and spraying dies are heated so that the outlet temperature for the confectionery material consisting of ice cream is approximately −10° to approximately −"C.

14. A device according to claim 12, wherein the outlet temperature for the confectionery material is approximately −9° to approximately −6° C.

15. A device according to claim 12, wherein the injection-molding and spraying dies and the feed lines are heated or thermally insulated so that the outlet temperature for a confectionery covering consisting of cocoa glaze is higher than its hardening temperature.

16. A device according to claim 1, wherein a section that is part of the injection-molding and spraying die for conveying ice cream and/or the feed line can be cooled.

17. A device according to claim 1, wherein a section that is part of the injection-molding and spraying die for conveying the confectionery material and/or the feed line is thermally insulated.

18. A device according to claim 1, wherein the height of the outlet slot and the resulting layer thickness of the confectionery layer is at least about 3 mm.

19. A device according to claim 1, wherein the outlet includes spray nozzles and the outlet diameter of the spray nozzles is at least approximately 0.5 mm.

20. A device according to claim 19, wherein the outlet diameter of the spray nozzles is approximately 0.8 mm.

21. A device according to claim 19, wherein the spray nozzles of the injection-molding and spraying die for forming neighboring confectionery layers are interconnected at least in sections.

22. A device according to claim 21, wherein the injection-molding and spraying die has an outlet opening corresponding substantially to the external contour of the confectionery product to be prepared, and further containing shape-forming profiled bars held by spacing means at a specified distance from each other which are disposed with space between them and the periphery of the outlet opening.

23. A device according to claim 22, wherein the spacing means consist of distance pins which respectively interconnect at least two of the neighboring profiled bars or one said profiled bar with an inside wall of the head of the injection-molding and spraying die.

24. A device according to claim 22, wherein the spray nozzles are disposed on the profiled bars.

25. A device according to claim 24, wherein the spray nozzles are disposed approximately centrally with respect to the longitudinal axis of the profiled bars.

26. A multilayer confectionery product prepared using the device of claim 1, comprising ice cream with interlayered covering, with at least two layers disposed one above the other, and confectionery-material-free air chambers disposed at least in sections between the layers disposed one above the other, with at least one wavy layer having a height greater than its thickness, wherein the wavy layers are so disposed that their crest lines run substantially in the longitudinal direction of the confectionery product.

27. A device according to claim 5, wherein the outlet slots of the injection-molding and spraying die are formed by an inside wall of a block-like head and a plurality of profiled bars which are disposed with space between each other as well as between them and the inside walls are held by spacing means.

28. A device according to claim 5, wherein a section that is part of the injection-molding and spraying die for conveying the confectionery material and/or the feed line is thermally insulated.

* * * * *